United States Patent [19]

Yokoyama

[11] Patent Number: 4,905,190

[45] Date of Patent: Feb. 27, 1990

[54] MULTIPROGRAM CONTROL INFORMATION PROCESSING SYSTEM WITH PROCESS ROLL-IN FROM MAIN MEMORY

[75] Inventor: Yasushi Yokoyama, Tokyo, Japan

[73] Assignee: NEC Corporation, Tokyo, Japan

[21] Appl. No.: 82,558

[22] Filed: Aug. 7, 1987

[30] Foreign Application Priority Data

Aug. 20, 1986 [JP] Japan ............................ 61-194916

[51] Int. Cl.[4] ................................................ G06F 9/00
[52] U.S. Cl. ................................ 364/900; 364/965.6;
364/966.1; 364/933.3; 364/933.7; 364/923.5
[58] Field of Search .................................. 364/200, 900

[56] References Cited

U.S. PATENT DOCUMENTS 4,318,182  3/1982  Bachman et al. ................... 364/200
4,374,409  2/1983  Bienvenu et al. ................... 364/200

*Primary Examiner*—Eddie P. Chan
*Assistant Examiner*—John G. Mills
*Attorney, Agent, or Firm*—Foley & Lardner, Schwartz, Jeffery, Schwaab, Mack, Blumenthal & Evans

[57] ABSTRACT

A multiprogram control information processing system with process roll-in from a main memory to hardware of a central processing unit is disclosed. The system includes a plurality of sets of visible registers corresponding to a plurality of processes stored in a main memory. The plurality of sets of visible registers are connected with a selector connected to an arithmetic unit. The selector selects one of the sets of visible registers according to an entry number corresponding to it. A memory stores the entry numbers of the sets of visible registers and identification codes of the processes in one-to-one correspondence. When an identification code is input, the memory outputs the entry number corresponding to the identification code to the selector thereby to immediately initiate execution of the process having the identification code.

6 Claims, 3 Drawing Sheets

FIG. 2

| VALIDATION FLAG | PROCESS IDENTIFICATION CODE | ENTRY NUMBER |
|---|---|---|
| 1 | A | 1 |
| 1 | B | 2 |
| 1 | C | 3 |
| 0 | D | 4 |

ASSOCIATIVE MEMORY 25

MULTIPROGRAM CONTROL INFORMATION PROCESSING SYSTEM WITH PROCESS ROLL-IN FROM MAIN MEMORY

BACKGROUND OF THE INVENTION

The present invention relates to a process roll-in system for an information processing apparatus and, more particularly, to control of a buffer memory of sets of visible registers in a process roll-in mode in an information processing apparatus having a multiprogram control function.

Multiple programming control for switching various programs and effectively executing them is an important basic control function in an information processing apparatus using a computer. For realizing multiprogram control, a central processing unit (CPU) of an information processing apparatus carries out the processing in unit of a process. The process is set in one of the running, ready, waiting, and suspend states. A process of the highest priority is selected from a queue of a plurality of ready processes by the CPU and the corresponding process is executed thereby. More specifically, the running process is set in the waiting state while the process requests an input/output operation and waits for completion of the input/output operation, so that the CPU can be occupied by another ready process. Upon completion of the input/output operation, the waiting process becomes ready and is added to the queue of the ready processes. The priority of this ready process is compared with that of the currently running process. If necessary, the currently running process is replaced with the ready process.

When the running process is set in the waiting state and the CPU is occupied by another process, or when the priority of the process added to the queue of the ready processes is higher than that of the currently running process, a process replacement (called process swapping) is performed.

In a conventional information processing apparatus having a multiprogram control function, the number of visible registers such as instruction counters or various arithmetic registers is equal to that of running processes. Therefore, process swapping is performed in the following procedures. The contents of the visible registers for a running process are saved or rolled out in a saving area assigned to this process in a main memory. Thereafter, the contents of a new process to be run are loaded or rolled in the visible registers from the corresponding saving area in the main memory. At the same time, an updated queue of the ready processes is generated.

In the conventional information processing apparatus described above, data must be exchanged between the main memory and the visible registers whenever the currently running process is replaced with another one. As a result, an overhead loss occurs and the system throughput is undesirably decreased.

SUMMARY OF THE INVENTION

It is an object of the present invention to provide a roll-in system for an information processing apparatus, wherein the number of cycles for transferring data from a main memory to visible registers in a process roll-in mode can be decreased with some probability to reduce the overhead loss and increase the system throughput in the roll-in mode.

A process roll-in system for an information processing apparatus comprises: a plurality of sets of visible registers, each of sets corresponding to each of a plurality of processes and having a distinct entry number; entry number generating unit having a memory for storing identification codes of the plurality of processes and the entry numbers of the plurality of sets of visible registers in one-to-one correspondence, the entry number generating unit being adapted to receive a given identification code of a process to be rolled in, to output a given entry number corresponding to the given identification code, to output a hit signal representing a coincidence, and to output a mishit signal if the given identification code is not present in the memory; selector unit for selecting one of the sets of visible registers in correspondence with the given entry number output from the entry number generating unit and for connecting a selected one of the sets of visible registers to an arithmetic unit; and roll-in control means for controlling to immediately initiate execution of a new process corresponding to the set of visible registers selected by the selector unit in response to the hit signal, and to output an arbitrary entry number from the memory to the selector unit and to roll-in the necessary information from the corresponding saving area in the main memory to an arbitrary set of visible registers having the arbitrary entry number in response to the mishit signal.

BRIEF DESCRIPTION OF THE DRAWINGS

FIG. 2 is a memory map for explaining the contents of an associative memory in FIG. 1.

DETAILED DESCRIPTION OF THE PREFERRED EMBODIMENT

A preferred embodiment according to the present invention will be described with reference to the accompanying drawings.

Figure 1:
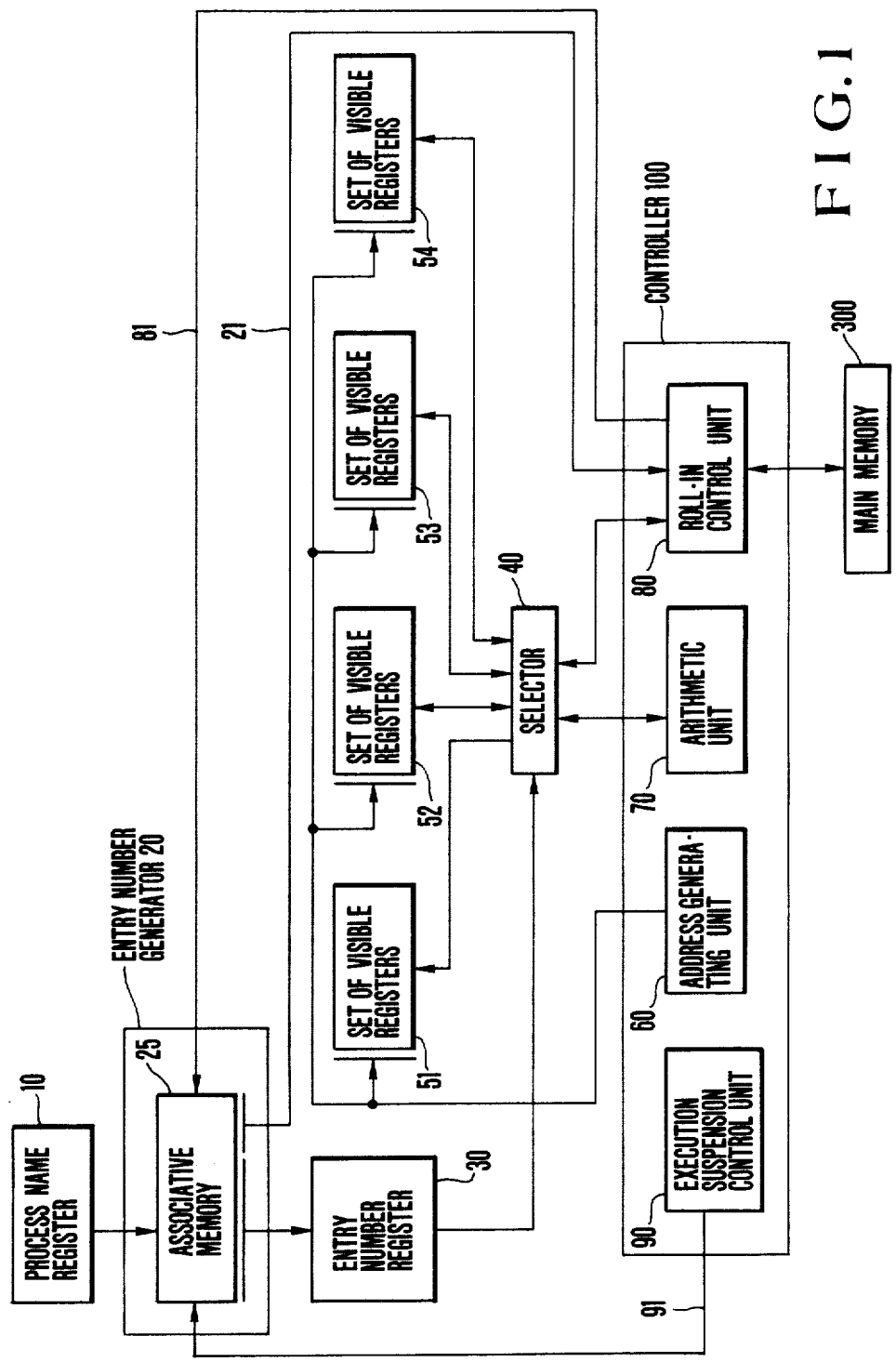
FIG. 1 is a block diagram showing a process roll-in system for an information processing apparatus according to an embodiment of the present invention.

FIG. 1 is a block diagram of a process roll-in system for an information processing apparatus according to the present invention.

Referring to FIG. 1, reference numeral 10 denotes a process name register in which an identification code of a process to be rolled in is loaded; and 20, an entry number generator for generating an entry number (to be described later) corresponding to an output from the process name register 10. The entry number generator 20 comprises an associative memory 25 for storing one-to-one correspondence between the process identification codes and the entry numbers.

Reference numeral 30 denotes an entry number register for storing an entry number output from the entry number generator 20; 40, a selector for selecting one of the four sets of visible registers 51, 52, 53, and 54 in response to the entry number output from the entry number register 30 and for connecting the selected set to a controller 100.

Each set of visible registers corresponds to each independent process. The number of sets is determined by trade-off of a hardware size (cost is proportional thereto) and an effect (improvement of the throughput). For illustrative convenience, four sets of visible registers are used in this embodiment.

The sets of visible registers 51 to 54 have different entry numbers, respectively. When the self entry number is stored in the entry number register 30, the corresponding set is selected by the selector 40 and is connected to the controller 100.

The controller 100 includes an address generating unit 60 connected to each set of visible registers 51, 52, 53, or 54 and for generating relative address signals for the base registers, general registers and the like constituting each set of visible registers, an arithmetic unit 70 connected to one of the sets of visible registers 51 to 54 through the selector 40 and for performing arithmetic operations, a roll-in control unit 80 for controlling roll-in operations between the main memory 300 and one of the sets of visible registers 51 to 54 which is selected by the selector 40, and an execution suspension control unit 90 (to be described later).

FIG. 2 is a memory map of the associative memory 25 for storing process identification codes, entry numbers of the sets of the visible registers 51 to 54 in correspondence with the process identification codes, and validation flags each of which represents the valid/invalid state of each set of visible registers specified by each entry number in one-to-one correspondence. The validation flag is set, for example, at logic "1" for valid state and "0" for invalid state.

The operation of the information processing apparatus shown in FIG. 1 will now be described. When a preparation for a new process on the basis of multiprogram control is to be performed, i.e., when the process roll-in mode is to be set, an identification code, e.g., A, of this process is set in the process name register 10. In the associative memory 25 in the entry number generator 20, an entry number corresponding to the identification code A is selected from the entries A, B, and C whose invalidation flags are valid ("1").

If a coincidence between the process identification code and the entry number is established (this coincidence is called a hit), the entry number corresponding to the identification code A (in this case, entry number 1) is loaded in the entry number register 30 by the entry number generator 20. At the same time, the entry number generator 20 supplies a hit signal to the roll-in control unit 80 through a signal line 21.

The selector 40 selects the set of visible registers 51 corresponding to the entry number 1 specified by the entry number register 30. The address generating unit 60 generates relative address signals for the respective visible registers in the set of visible registers 51 designated by a machine instruction. Data exchange (write and read operations) between the arithmetic unit 70 and the visible register having a specific relative address corresponding to the specific entry number can be performed.

When the roll-in control unit 80 receives the hit signal from the entry number generator 20, the roll-in control unit 80 inhibits rolling-in from the saving area (for the set of visible registers 51 corresponding to a given process represented by the hit signal) in the main memory 300 to the set of visible registers 51 since the set of visible registers 51 corresponding to the given process are present and valid in hardware. Therefore, the roll-in control unit 80 immediately initiates execution of a new process.

However, when the corresponding entry number is not found by the entry number generator 20, i.e., when a mishit occurs, the entry number generator 20 sends a mishit signal to the roll-in control unit 80 through the signal line 21. The roll-in control unit 80 writes a new process identification code, e.g., E, a new process entry number, and the validation flag of logic "1" is written in the associative memory 25 in the entry number generator 20 through a signal line 81. For example, the process identification code E is written in place of the process identification code C in FIG. 2. In order to effectively operate the system, a known LRU (Least Recently Used) scheme may be used to select the entry number corresponding to the process to be overwritten. However, selection of such a scheme is not limited according to the present invention. When information of the same identification code as the process identification code set in the process name register 10 is written in the associative memory 25, entry number 3 corresponding to the new process identification code E is stored in the entry number register 30. The roll-in control unit 80 reads out data from the saving area corresponding to that of the new process E in a main memory 300 and stores the readout data at addresses of the set of visible registers 53 having the entry number 3 designated by the entry number register 30, in response to the address signals supplied from the address generating unit 60.

In the process roll-out operation, the contents of the set of visible registers corresponding to the process to be rolled out are saved in the saving area corresponding to this process in the main memory 300 in the same manner as in the conventional case. In the process roll-in operation, even if a mishit occurs, the contents of the entry of the set of visible registers 53 subjected to overwriting need not be saved in the main memory 300. Alternatively, in the process roll-out operation, the contents of the visible registers for the process subjected to roll-out are not saved. In this case, if a mishit occurs in the roll-in mode, the contents of the entry subjected to overwritten may be saved in the main memory. However, saving for the nonrunning processes complicates control in this case. In this embodiment, therefore, saving is always performed in the roll-out mode to simplify such control.

In multiprogram control, a specific process may be set in a suspending state in addition to the running, reading, and waiting states. In this case, the entry number generator 20 checks whether the corresponding process identification code is registered in the associative memory 25. If so, the validation flag for the corresponding process is set at logic "0" in the associative memory 25 by the execution suspension control unit 90 through a signal line 91.

Figure 3:
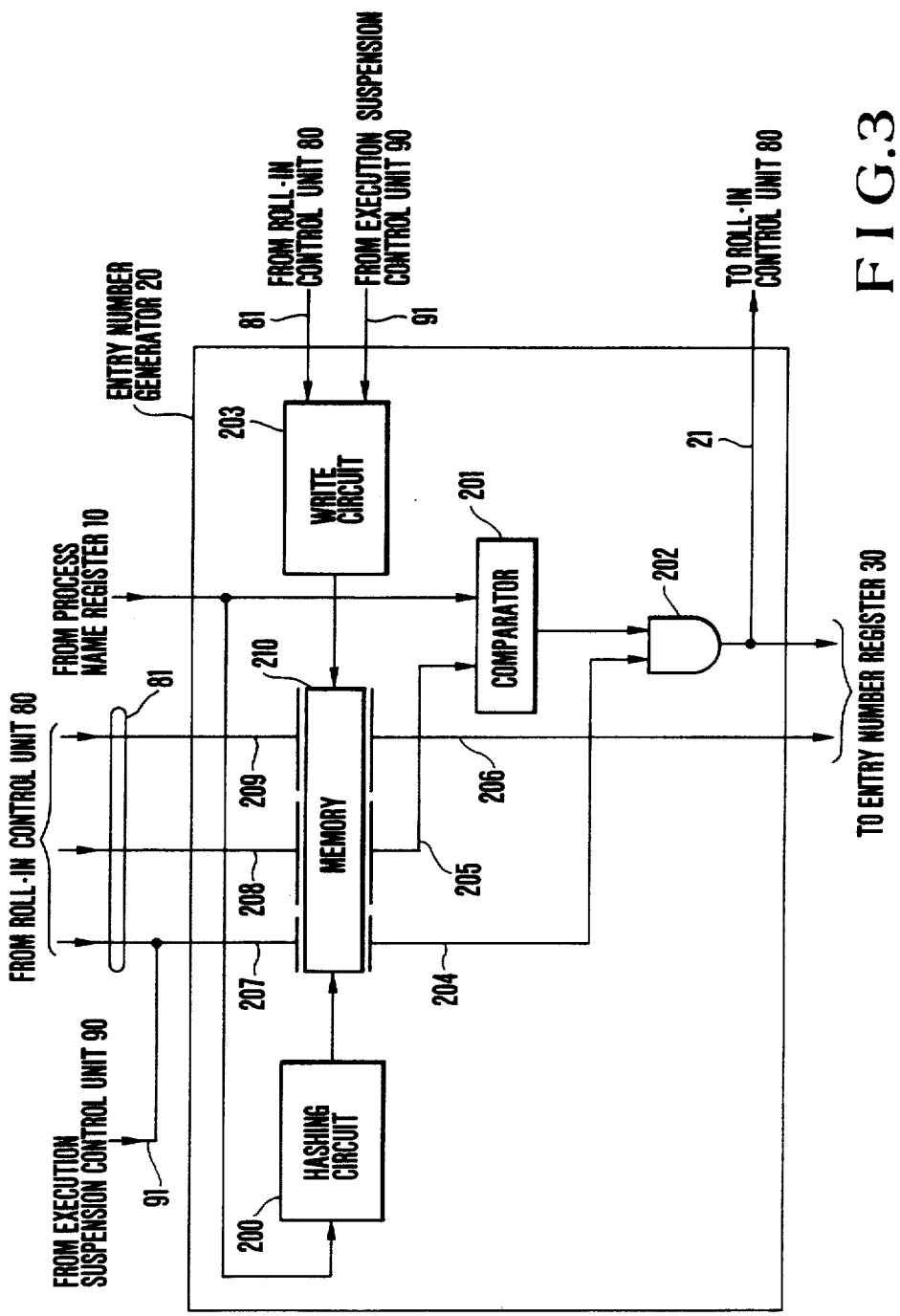
FIG. 3 is a block diagram showing an arrangement of an entry number generator in FIG. 1.

FIG. 3 is a block diagram showing an arrangement of the entry number generator 20. The same reference numerals as in FIG. 1 denote the same parts in FIG. 3. Reference numeral 200 denotes a hashing circuit; 201, a comparator; 202, an AND gate; 203, a write circuit; 204, a validation flag read line; 205, a process identification code read line; 206, an entry number read line; 207, a validation flag write line; 208, a process identification code write line; 209, an entry number write line; and 210, a memory. The hashing circuit 200 sequentially generates address signals for the memory 210 on the basis of the process identification codes sequentially set in the process name register 10. The process identification code read out through the read line 205 is compared by the comparator 201 with the corresponding process identification name set in the process name register 10. When a coincidence is established by this comparison and a flag read out on the read line 204 is valid, an output from the AND gate 202 becomes active and the set signal is sent to the entry number register 30. The entry number appearing on the read line 206 is set in the entry number register 30. If a mishit occurs, the signal line 21 is kept disabled. The write circuit 203 receives an instruction from the roll-in control unit 80 through the signal line 81 or from the execution suspension control unit 90 through the signal line 91 and writes overwrite data appearing on the write lines 207 to 209 in the memory 210. The write access from the roll-in control unit 80 is performed for the validation flag, the process identification code, and the entry number in the memory 210. The write access from the execution suspension control unit 90 is performed for only the validation flag.

According to the present invention as described above, the sets of visible registers are respectively arranged for the plurality of ready processes in one-to-one correspondence. The correspondence between the process names and the sets of visible registers is controlled by the associative memory. Data transfer from the main memory to the set of visible registers is inhibited with a given probability. The overhead loss in the process roll-in mode can be reduced and the system throughput can be increased.

What is claimed is:

1. A multiprogram control information processing system with process roll-in from a main memory to hardware of a central processing unit of said multiprogram control information processing system, comprising:

a plurality of sets of visible registers, each of said plurality of sets of visible registers corresponding to each of a plurality of processes stored in corresponding saving areas of said main memory, having a distinct entry number and being configured by various registers for collectively representing current processing status of the corresponding process;

entry number generating means having a memory for storing identification codes of said plurality of processes and the entry numbers of said plurality of sets of visible registers in one-to-one correspondence, said entry number generating means being adapted to receive a given identification code of a process to be rolled in from said main memory, to output a given entry number corresponding to the given identification code, to output a hit signal representing a coincidence, and to output a mishit signal if the given identification code is not present in said memory;

selector means for selecting one of said plurality of sets of visible registers in correspondence with the given entry number output from said entry number generating means to connect the one of said plurality of sets of visible registers selected by said selecting means to an arithmetic unit; and roll-in control means for controlling to immediately initiate execution of a new process corresponding to said set of visible registers selected by said selector means in response to the hit signal, and to output an entry number selected from said memory according to an arbitrary selection scheme to said selector means and to roll-in the necessary information from said corresponding saving area in said main memory to a set of visible registers having the entry number selected according to the arbitrary selection scheme in response to the mishit signal.

2. A system according to claim 1, wherein said memory stores the identification codes of the plurality of processes, entry numbers corresponding to the identification codes and validation flags each representing a valid/invalid state of said set of visible registers corresponding to each entry number, the validation flag being set to be valid or invalid in accordance with a control signal output from said roll-in control means.

3. A system according to claim 1, wherein said roll-in control means comprises means, commonly connected to said plurality of sets of visible registers, for generating common addresses designating registers in each of said plurality of sets of visible registers.

4. A system according to claim 2, wherein said roll-in control means comprises for invalidating the validation flag of said memory.

5. A system according to claim 1, further comprising an entry number register through which the entry number from said entry number generating means is transmitted to said selector means.

6. A system according to claim 1, further comprising a process name register through which the process identification code of the process to be rolled in is supplied to said entry number generating means.

* * * * *

UNITED STATES PATENT AND TRADEMARK OFFICE
CERTIFICATE OF CORRECTION

PATENT NO. : 4,905,190

DATED : February 27, 1990

INVENTOR(S) : Yasushi YOKOYAMA

It is certified that error appears in the above—identified patent and that said Letters Patent is hereby corrected as shown below:

Column 6, line 35, after "comprises" insert --means--.

Signed and Sealed this

Tenth Day of December, 1991

Attest:

HARRY F. MANBECK, JR.

*Attesting Officer*   Commissioner of Patents and Trademarks